United States Patent
Richmond

[11] 3,896,441
[45] July 22, 1975

[54] ELECTRIC SIGNALING SYSTEM
[75] Inventor: Martin R. Richmond, Nashua, N.H.
[73] Assignee: Sanders Associates, Inc., Nashua, N.H.
[22] Filed: Apr. 14, 1954
[21] Appl. No.: 423,178

[52] U.S. Cl. ...... 343/18 E; 343/6.8 R; 343/17.1 PF
[51] Int. Cl. .................... G01s 9/56; H04k 3/00
[58] Field of Search............. 343/18, 6.5, 6.8, 6.8 R, 343/6.8 LC, 17.1 PF, 18 E, 101; 250/15 T, 27 PS; 340/347

[56] References Cited
UNITED STATES PATENTS
| | | | |
|---|---|---|---|
| 2,440,253 | 4/1948 | Dodington | 343/18 |
| 2,489,273 | 11/1949 | Dodington | 343/18 |
| 2,561,363 | 7/1951 | Haeff | 343/18 |

Primary Examiner—Malcolm F. Hubler
Attorney, Agent, or Firm—Louis Etlinger

EXEMPLARY CLAIM

1. An electrical apparatus for producing a sequence of pulses of high frequency energy in response to a received pulse, wherein the frequencies of selected produced pulses are successively algebraically increased by a predetermined increment comprising in combination, means for receiving a pulse of high frequency electric energy; means for translating said pulse with a delay of a predetermined time interval; means for converting said delayed pulse into a frequency enhanced pulse having a frequency algebraically increased from that of said delayed pulse by a predetermined increment; means for feeding back a pulse of a portion of the energy of said frequency enhanced pulse; means for translating said feed-back pulse with a delay of a predetermined time interval; means for converting said delayed feed-back pulse into a further frequency enhanced pulse having a frequency algebraically increased from that of said delayed feed-back pulse by a predetermined increment; and means for translating the resultant sequence of pulses having successively algebraically increased frequencies.

11 Claims, 3 Drawing Figures

Martin R. Richmond
INVENTOR.

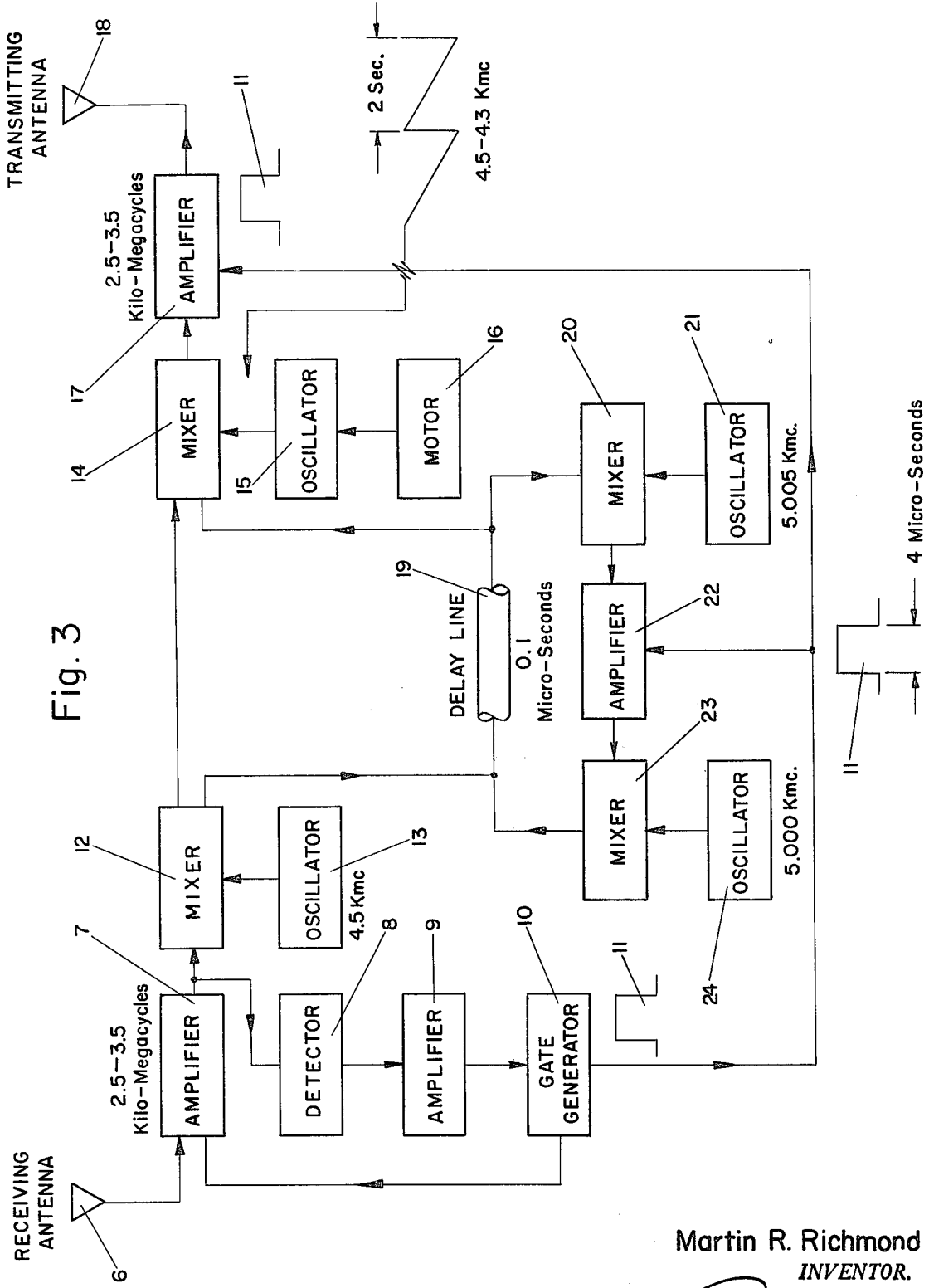

ELECTRIC SIGNALING SYSTEM

This invention relates to the art of electronic signaling devices. More particularly, it relates to electronic apparatus such as is used to render enemy radar equipment inoperative.

In the prior art various systems have been proposed for producing a sequence of pulses of electric energy in response to a received pulse. These systems have been sensitive to the frequency and rate of occurrence of the received pulses and, in general, have been limited in response to a single source of signals.

It is an object of the present invention to provide an improved electronic apparatus for producing a sequence of high frequency electric energy pulses in response to received pulses, which apparatus operates substantially independently of the rate of occurrence of the received pulses.

It is a further object of the invention to provide an improved electronic apparatus for producing a sequence of high frequency electric energy pulses that is responsive to received pulses over a relatively wide range of frequencies.

A still further object of the invention is to provide an improved electronic apparatus for producing a sequence of high frequency electric energy pulses in response to received pulses, wherein the produced pulses are displaced by predetermined time intervals and their frequencies are successive in a predetermined order.

Other and further objects of the invention will be apparent from the following description of a typical embodiment thereof, taken in connection with the accompanying drawings.

In accordance with the present invention there is provided an electronic apparatus for producing a sequence of pulses of high frequency energy in response to a received pulse. The apparatus successively algebraically increases frequencies of selected produced pulses by a predetermined increment. The apparatus includes means for receiving a pulse of high frequency electric energy and means for translating the pulse with a delay of a predetermined time interval. The apparatus also includes means for converting the delayed pulse into a frequency enhanced pulse having a frequency algebraically increased from that of the delayed pulse by a predetermined increment. In addition, the apparatus includes means for feeding back a pulse of a portion of the energy of the frequency enhanced pulse and means for translating the feedback pulse with a delay of a predetermined time interval. There are also means for converting the delayed feedback pulse into a further frequency enhanced pulse having a frequency algebraically increased from that of the delayed feedback pulse by a predetermined increment and means for translating the resultant sequence of pulses having successively algebrically increased frequencies.

In the accompanying drawings;

FIG. 3 is a detailed shcematic block diagram of a preferred embodiment of the present invention.

Figure 1:
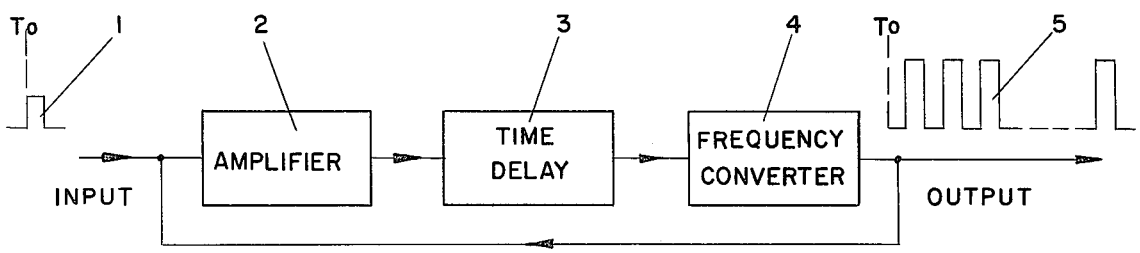
FIG. 1 is a schematic block diagram of essential elements of a system embodying the present invention.

Referring now in more detail to the drawings, in FIG. 1 an input pulse 1 of high frequency electric energy is illustrated as impressed upon the input of an amplifier 2. The output of amplifier 2 is coupled through a time delay circuit 3 to a frequency converter 4. The converter 4 causes the frequency of the input pulse 1 to increase or decrease by an incremental frequency $\Delta f$. A portion of the output of the converter 4 is coupled back to the input of the amplifier 2 as shown. Assuming the existence of only one pulse to initiate the process, an infinite series of pulses would appear at the output as indicated at 5.

In FIG. 3 the schematic block diagram of an electronic apparatus as used in radar countermeasure equipment is illustrated. The equipment as shown is designed to present false range information to enemy fire control radar. It employs conventional circuits. The design of this embodiment is predicated on enemy radar equipment which transmits and receives pulses of high frequency electric energy, and employs an automatic target tracking system to provide continuous range information of a target. It is further assumed that the automatic target tracking system is capable of locking on only one target at a time. In terms of the time position of the target relative to an enemy radar, this implies that the enemy radar is responsive to a signal for a relatively short increment of time surrounding the time required for transmitted pulses to travel to the target and return. It is an object of this embodiment to capture the automatic target tracking system and cause it to produce false range information and thus render the fire control apparatus useless.

Referring now in more detail to FIG. 3, a receiving antenna 6 is connected to an amplifier 7 employing, for example, a traveling wave tube of well-known type, such as manufactured by Federal Telecommunications Laboratories. The output of the amplifier 7 is applied to a video detector 8 which in turn is coupled to a video amplifier 9. The output of the amplifier 9 is coupled to and serves to trigger a gate generator 10, which is a single-cycle multivibrator and produces a 4-microseconds square wave gate pulse 11. The gate pulse enables various portions of the system as will be described below. The output of amplifier 7 is also applied to a frequency converter stage comprising a heterodyne frequency mixer circuit 12, employing well-known conventional circuits such as, for example, a crystal diode and an oscillator, such as a reflex klystron circuit. An output of mixer 12 is applied to a second frequency converter comprising another mixer circuit 14 and oscillator 15. A conventional type of mechanical modulator 16 periodically varies the frequency of oscillator 15 by varying, for example, the resonant frequency of the tuned cavity of a reflex klyston with a motor system in the well-known manner. The output of mixer 14 is applied to amplifier 17 and is radiated by transmitting antenna 18. The amplifier 17 is enabled by the 4-microseconds gate pulse 11 coupled from the generator 10, as shown.

Another output of the mixer 12 is applied to a delay line 19 comprising a length of coaxial line, for example one-eighth inch in diameter and 66 feet long. An output of the line 19 is applied to the mixer 14. Another output is applied to still another frequency converter comprising a conventional mixer circuit 20 and oscillator 21. The output of mixer 20 is applied to amplifier 22 which is enabled by the pulse 11 from the generator 10. The output of amplifier 22 is applied to the frequency converter comprising a conventional mixer circuit 23 and oscillator 24. The output of mixer 23 provides another input for the delay line 19.

Figure 2:
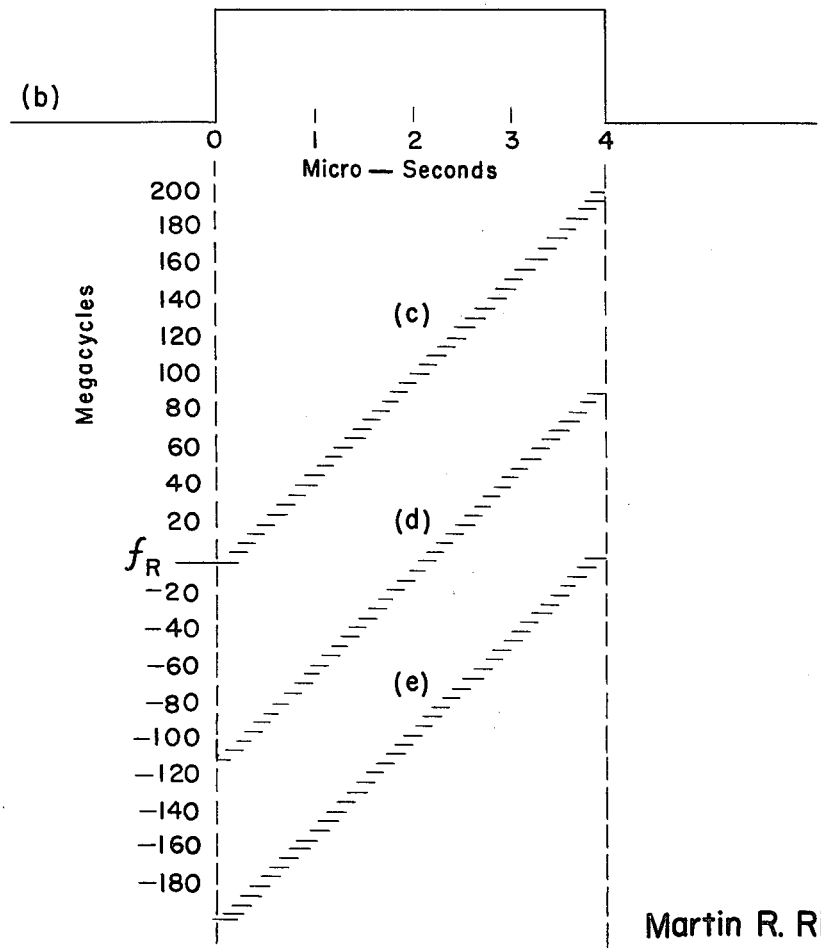
FIG. 2 is a group of curves illustrating a series of voltage and frequency variations associated with a preferred embodiment.

The operation of the preferred embodiment of the invention illustrated can be better understood with reference to the schematic diagram of FIG. 3 and the wave forms of FIG. 2. A radio frequency signal comprising pulses of high frequency electric energy in the region from 2.5 to 3.5 kilo-megacycles, for example, is received in the antenna 6 and amplified by amplifier 7. The output of amplifier 7 is applied to two channels. One includes detector 8, amplifier 9 and 4-microseconds gate pulse generator 10, and the other includes the frequency converter comprising the mixer 12 and oscillator 13.

The detector 8 produces a video pulse which is amplified by the amplifier 9 to trigger the generator 10 and produce the 4-microseconds gate pulse 11. The pulse 11 actuates the amplifier 22 and permits the circulating time delay and frequency conversion system to function. This system comprises delay line 19, amplifier 22 and frequency converters consisting of mixer 20 and oscillator 21, and mixer 23 and oscillator 24. The pulse 11 also enables amplifier 17 and permits radiation of a new signal through transmitting antenna 18.

The received pulse at the output of amplifier 7 is coupled to the mixer 12 which, in combination with the output of oscillator 13, for example 4.5 kilo-megacycles, produces intermediate frequency pulses. An output of mixer 12 is coupled directly to mixer 14 which, in combination with the output of oscillator 15, for example 4.5 kilo-megacycles, reproduces pulses at the original frequency at an enhanced level. These pulses are then amplified by amplifier 17 and reradiated by the transmitting antenna 18.

The 4-microseconds gate pulse 11 is also applied to the amplifier 7 to disable it during the duration of the pulse. This has the effect of preventing feed through of radiated energy from the transmitting antenna 18 to the receiving antenna 6 for the duration of the pulse 11.

The pulses from the output of mixer 12 are coupled through delay line 19 where a 0.1-microseconds delay is introduced. The delay line 19 responds to pulses having frequencies in the region from 1 to 2 kilo-megacycles, for example. The delayed pulse is coupled to the mixer 20 which, in combination with oscillator 21 operating at, for example, 5.005 kilo-megacycles, produces a pulse having an intermediate frequency, for example 3 to 4.2 kilo-megacycles, that is amplified by amplifier 22. The output of amplifier 22 is applied to mixer 23 which, in combination with the output of oscillator 24 operating at 5 kilo-megacycles, for example, produces an intermediate frequency pulse reduced in frequency by a 5-megacycle increment. This reduced frequency pulse is coupled through delay line 19 and delayed again by 0.1-microseconds. An output is then applied to mixer 14 which, in combination with oscillator 15 operating at 4.5 kilo-megacycles, produces an enhanced pulse at a frequency 5 megacycles greater than the frequency of the received pulse; the enhanced pulse is amplified by amplifier 17 and radiated from transmitting antenna 18. The other output of the delay line 19 is recirculated until a sequence of 40 pulses is produced that are displaced by 0.1-microseconds time intervals and have successive frequencies monotonically increasing in 5-megacycle increments.

From the above description it is clear that a pulse received at a certain frequency is almost immediately retransmitted at the same frequency, but at a higher energy level to effectively capture the automatic tracking system of the enemy radar. The first of the succeeding 40 pulses is also at the same frequency and consequently will be received by the enemy radar. The other 39 pulses, however, being of a different frequency will not be received. Thus, the immediate effect of the equipment would seem to be to enhance the appearance of the target observer and provide a better indication of range information than would otherwise be obtainable.

It is, however, a further object of this embodiment to present a deceptive target to the enemy radar that appears to be moving away from the enemy radar. Assume the signal from the enemy radar to be recurrent at a thousand times per second and nominal maneuverability of the observer aircraft to be such that the aircraft may depart at the rate of 1,000 feet per second. By transmitting successive sequences of pulses of changing characteristics, a deceptive signal is presented to the enemy radar that causes it to lock on the deceptive signal at the rate of 1,000 feet per second for 2 seconds, for example. The mechanical modulator 16 causes the frequency of the oscillator 15 to vary from 4.5 to 4.3 kilo-megacycles at a frequency of one-half cycle per second. Thus, a complete cycle requires 2 seconds as illustrated by the curve (a) in FIG. 2.

If the frequency of the oscillator 15 is caused to vary from 4.5 to 4.3 kilo-megacycles as described, then the sequence of pulses which is retransmitted will vary accordingly. Thus, if the frequency of the oscillator 15 is 4.5 kilo-megacycles then the first pulse in the sequence is retransmitted at the original carrier frequency, the next pulse is 5 megacycles higher, the next is 5 megacycles higher than the previous pulses and so forth, as illustrated in the curve (c) in FIG. 2. If the frequency of oscillator 15 is 4.3 kilo-megacycles then the original carrier frequency will only be retransmitted by the last of the sequence of 40 pulses, as shown by the curve (e) in FIG. 2. It is to be noted, however, that the last of these pulses is delayed by 4-microseconds from the time of the received pulse. It is then obvious that varying the frequency of oscillator 15 from 4.5 to 4.3 kilo-megacycles will result in producing a sequence of pulses at the frequency to which the enemy radar is tuned and delayed in time increments of 0.1-microseconds per 5 megacycles change of frequency of the oscillator 15.

Since the repetition period of the frequency changing oscillator 15 is not synchronous with the repetition rate of any radar signal which may come through the system, the first signal that is received may not be retransmitted with zero initial delay time. It will, however, do so within 2 seconds of the time of initial detection, that is within the period of change of oscillator 15. This, of course, is not serious since adequately strong signals may be received from the enemy radar long before echoes of the observer's aircraft is detectable in the enemy radar receiver. It should also be noted that this system will operate with any number of incident signals so long as they are relatively unsynchronized. The frequency response of the system is inherently unlimited. In practice, the frequency response is limited by the frequency characteristics of the components chosen.

The detector 8 may be biased in accordance with a signal strength commensurate with the sensitivity of the enemy radar. This is done to avoid notifying the enemy radar of the presence of an observer target before detection by it.

The art of electric decoding, coding and communication of information is greatly enhanced by the present invention.

It will be seen that from the above description that the present invention is based upon the well-defined principles of frequency conversion employing conventional heterodyne techniques. The components used in this system are special only in the sense that they are employed in that portion of the frequency spectrum termed "microwave" in modern electronic practice. However, all of the microwave techniques employed in the embodiment of the invention illustrated are well known in the art and conventional in character, and need no further details of description to enable one skilled in the art to practice the invention.

While there has been hereinbefore described what is at present considered a preferred embodiment of the invention, it will be apparent than many and various changes and modifications may be made with respect to the embodiment illustrated, without departing from the spirit of the invention. It will be understood, therefore, that all those changes and modifications as fall fairly within the scope of the present invention, as defined in the appended claims, are to be considered as a part of the present invention.

What is claimed is:

1. An electrical apparatus for producing a sequence of pulses of high frequency energy in response to a received pulse, wherein the frequencies of selected produced pulses are successively algebraically increased by a predetermined increment comprising in combination, means for receiving a pulse of high frequency electric energy; means for translating said pulse with a delay of a predetermined time interval; means for converting said delayed pulse into a frequency enhanced pulse having a frequency algebraically increased from that of said delayed pulse by a predetermined increment; means for feeding back a pulse of a portion of the energy of said frequency enhanced pulse; means for translating said feed-back pulse with a delay of a predetermined time interval; means for converting said delayed feed-back pulse into a further frequency enhanced pulse having a frequency algebraically increased from that of said delayed feed-back pulse by a predetermined increment; and means for translating the resultant sequence of pulses having successively algebraically increased frequencies.

2. An electrical apparatus for producing a sequence of pulses of high frequency energy in response to a received pulse, wherein the frequencies of selected produced pulses are successively algebraically increased by the same predetermined increment comprising in combination, means for receiving a pulse of high frequency electric energy; means for translating said pulse with a delay of a predetermined time interval; means for converting said delayed pulse into a frequency enhanced pulse having a frequency algebraically increased from that of said delayed pulse by a predetermined increment; means for feeding back a pulse of a portion of the energy of said frequency enhanced pulse; means or translating said feed-back pulse with a delay of a predetermined time interval; means for converting said delayed feed-back pulse into a further frequency enhanced pulse having a frequency algebraically increased from that of said delayed feedback pulse by said predetermined increment; and means for translating the resultant sequence of pulses having successively algebraically increased frequencies.

3. An electrical apparatus for producing a sequence of pulses of high frequency energy in response to a received pulse, wherein the frequencies of selected produced pulses are successively algebraically increased by a predetermined increment comprising in combination, means for receiving a pulse of high frequency electric energy; means for translating said pulse with a delay of predetermined time interval; means for converting said delayed pulse into a frequency enhanced pulse having a frequency algebraically increased from that of said delayed pulse by a predetermined increment; means for feeding back a pulse of a portion of the energy of said frequency enhanced pulse; means for translating said feed-back pulse with said delay of a predetermined time interval; means for converting said delayed feed-back pulse into a further frequency enhanced pulse having a frequency algebraically increased from that of said delayed feed-back pulse by a predetermined increment; and means for translating the resultant sequence of pulses having successively alegbraically increased frequencies.

4. An electrical apparatus for producing a sequence of pulses of high frequency energy in response to a received pulse, wherein the frequencies of selected produced pulses are successively algebraically increased by a predetermined increment comprising in combination, means for receiving a pulse of high frequency electric energy; means for amplifying said pulse; means for translating said pulse with a delay of a predetermined time interval; means for converting said delayed pulse into a frequency enhanced pulse having a frequency algebraically increased from that of said delayed pulse by a predetermined increment; means for feeding back a pulse of a portion of the energy of said frequency enhanced pulse; means for amplifying said feed-back pulse; means for translating said feed-back pulse with a delay of a predetermined time interval; means for converting said delayed feed-back pulse into a further frequency enhanced pulse having a frequency algebraically increased from that of said delayed feed-back pulse by a predetermined increment; and means for translating the resultant sequence of pulses having successively algebracially increased frequencies.

5. An electrical apparatus for producing a sequence of pulses of high frequency energy in response to a received pulse, wherein the frequency of selected produced pulses are successively algebraically increased by a predetermined increment comprising in combination, means for receiving a pulse of high frequency electric energy; means for translating said pulse with a delay of a predetermined time interval; means for converting said delayed pulse into a frequency enhanced pulse having a frequency algebraically increased from that of said delayed pulse by a predetermined increment; means for feeding back a pulse of a portion of the energy of said frequency enhanced pulse; means for translating said feed-back pulse with a delay of a predetermined time interval; means for converting said delayed feed-back pulse into a further frequency enhanced pulse having a frequency algebraically increased from that of said delayed feed-back pulse by a predetermined increment; means for producing a predetermined number of frequency enhanced pulses in the manner of said further frequency enhanced pulse; and means for translating the resultant sequence of pulses having successively algebraically increased frequencies.

6. An electrical apparatus for producing a plurality of sequences of pulses of high frequency energy in response to received pulses, wherein the frequency of selected produced pulses of a given sequence are successively algebraically increased by a predetermined increment comprising in combination, means for receiving pulses of high frequency electric energy; means for translating said pulses with a delay of a predetermined time interval; means for converting said delayed pulses into frequency enhanced pulses having respective frequencies algebraically increased from that of said delayed pulses by a predetermined increment; means for feeding back respective pulses of a portion of the energy of said frequency enhanced pulses; means for translating said feed-back pulses with a delay of a predetermined time interval; means for converting said delayed feed-back pulses into further frequency enhanced having respective frequencies algebraically increased from that of said delayed feed-back pulses by a predetermined increment; and means for translating the resultant sequences of pulses having successively algebraically increased frequencies respectively.

7. An electrical apparatus for producing a sequence of a predetermined number of pulses of high frequency energy in response to a received pulse, wherein the frequencies of selected produced pulses are successively algebraically increased by the same predetermined increment, comprising in combination, means for receiving a pulse of high frequency electric energy; means for detecting said received pulse; means for utilizing said received pulse to permit the transmission of said sequence for a predetermined time interval and to disable the reception of other pulses during said predetermined time interval; means for converting said received pulse to produce a first intermediate frequency pulse; means for converting said intermediate pulse to restore its frequency to the frequency of the received pulse; means for amplifying said restored first intermediate frequency pulse; means for transmitting said amplified restored pulse; means for translating a portion of the energy of said first intermediate pulse for a predetermined delay time interval; means for converting said delayed pulse to restore its frequency to that of said received pulse; means for amplifying said delayed restored pulse; means for transmitting said amplified delayed restored pulse; means for converting a portion of the energy of said delayed first intermediate frequency pulse to produce a second intermediate frequency pulse; means for amplifying said second intermediate frequency pulse; means for converting said second intermediate pulse to produce a third intermediate frequency pulse having a frequency algebraically increased from said second intermediate frequency pulse by said predetermined incremental frequency; means for translating said third intermediate frequency pulse by said predetermined delay time interval; means for converting said third intermediate frequency pulse to produce a radio frequency pulse having its frequency algebraically increased from said delayed restored pulse by said increment; means for amplifying said radio frequency pulse; means for transmitting said radio frequency pulse; means for producing a succession of radio frequency pulses in the manner of the first said radio frequency pulse; and means for transmitting said sequence of a predetermined number of pulses.

8. An electric, signaling system for producing a sequence of pulses of high-frequency energy in response to a received pulse, comprising, in combination: receiver means for receiving a pulse of said energy; circulator means coupled to said receiver means and including, in combination, time-delay means for translating said pulse for a predetermined time interval, frequency converter means coupled to said time-delay means for converting said pulse into a frequency-enhanced pulse differing from said translated delayed pulse by a predetermined, algebraic, frequency increment and feedback means coupling said converter means and said time-delay means, said circular means circulating therethrough a portion of the energy of said delayed, frequency-enchanced pulse to a resultant sequence of pulses successively displaced by a predetermined time interval and a predetermined, algebraic, frequency increment; and transmitter means coupled to said circulatory means for transmitting said resultant sequence of pulses to provide said electric signaling system.

9. An electric, signaling system for producing a sequence of pulses of high-frequency energy in response to a received pulse, comprising, in combination: receiver means for receiving a pulse of said energy; means coupled to said receiver means for retransmitting at an amplified energy level a pulse at the same frequency as said received pulse; circulator means coupled to said receiver means and including, in combination, time-delay means for translating said received pulse for a predetermined time interval, frequency converter means coupled to said time-delay means for converting said pulse into a frequency-enchanced pulse differing from said translated delayed pulse by a predetermined, algebraic, frequency increment and feedback means coupling said converter means and said time-delay means, said circulator means circulating therethrough a portion of the energy of said delayed, frequency-enhanced pulse to produce a resultant sequence of pulses successively displaced by a predetermined time interval and a predetermined, algebraic, frequency increment; and transmitter means coupled to said circulator means for transmitting said resultant sequence of pulses to provide said electric signaling system.

10. An electric, signaling system for producing a sequence of pulses of high-frequency energy in response to a received pulse, comprising, in combination: receiver means for receiving a pulse of said energy; means coupled to said receiver means for retransmitting a pulse at an amplified energy level and after a predetermined time interval a pulse at the same frequency as said received pulse; circulator means coupled to said receiver means and including, in combination, time-delay means for translating said received pulse for a predetermined time interval, frequency converter means coupled to said time-delay means for converting said pulse into a frequency-enhanced pulse differing from said translated delayed pulse by a predetermined, algebraic, frequency increment and feedback means coupling said converter means and said time-delay means, said circulator means circulating therethrough a portion of the energy of said delayed, frequency-enhanced pulse to produce a resultant sequence of pulses successively displaced by a predetermined time interval and a predetermined, algebraic, frequency increment; and transmitter means coupled to said circulator means for transmitting said resultant sequence of pulses to provide said electric signaling system.

11. An electric, signaling system for producing a sequence of pulses of high-frequency energy in response to a received pulse, comprising, in combination: receiver means for receiving a pulse of said energy; circulator means coupled to said receiver means and including, in combination, time-delay means for translating said pulse for a predetermined time interval, frequency converter means coupled to said time-delay means for converting said pulse into a frequency-enhanced pulse differing from said translated, delayed pulse by a predetermined, algebraic, frequency increment and feedback means coupling said converter means and said time-delay means, said circulator means circulating therethrough a portion of the energy of said delayed, frequency-enhanced pulse to produce a resultant sequence of pulses successively displaced by a predetermined time interval and a predetermined, algebraic, frequency increment; transmitter means coupled to said circulator means for transmitting said resultant sequence of pulses to provide said electric signaling system; and means responsive to said received pulse for controlling the operation of said receiver circulator and transmitter means to provide a predetermined number of pulses in said sequence.

* * * * *